United States Patent
Kim et al.

(10) Patent No.: US 10,749,738 B2
(45) Date of Patent: Aug. 18, 2020

(54) METHOD AND APPARATUS FOR DIAGNOSING NETWORK

(71) Applicant: Hyundai Motor Company, Seoul (KR)

(72) Inventors: Dongok Kim, Gyeonggi-do (KR); Kang Woon Seo, Gyeonggi-do (KR); Jun Byung Chae, Seoul (KR); Jin Hwa Yun, Seoul (KR); Sang Woo Yu, Seoul (KR)

(73) Assignee: Hyundai Motor Company, Seoul (KR)

( * ) Notice: Subject to any disclaimer, the term of this patent is extended or adjusted under 35 U.S.C. 154(b) by 430 days.

(21) Appl. No.: 14/802,741

(22) Filed: Jul. 17, 2015

(65) Prior Publication Data

US 2017/0019295 A1  Jan. 19, 2017
US 2019/0190772 A9  Jun. 20, 2019

Related U.S. Application Data

(60) Provisional application No. 62/026,343, filed on Jul. 18, 2014, provisional application No. 62/026,335, filed on Jul. 18, 2014.

(51) Int. Cl.
| | |
|---|---|
| *H04L 12/24* | (2006.01) |
| *H04L 29/08* | (2006.01) |
| *H04L 12/40* | (2006.01) |
| *H04L 29/06* | (2006.01) |
| *H04L 12/26* | (2006.01) |

(52) U.S. Cl.
CPC ......... *H04L 41/0677* (2013.01); *H04L 12/40* (2013.01); *H04L 43/0817* (2013.01); *H04L 43/12* (2013.01); *H04L 67/12* (2013.01); *H04L 69/08* (2013.01)

(58) Field of Classification Search
None
See application file for complete search history.

(56) References Cited

U.S. PATENT DOCUMENTS

| | | | |
|---|---|---|---|
| 8,279,759 B1* | 10/2012 | Jones | H04L 43/0852 370/248 |
| 2003/0033365 A1* | 2/2003 | Garnett | G06F 1/183 709/203 |
| 2008/0002691 A1* | 1/2008 | Qi | H04L 12/1868 370/390 |
| 2011/0122763 A1* | 5/2011 | Qian | H04L 41/0686 370/221 |

(Continued)

FOREIGN PATENT DOCUMENTS

| | | |
|---|---|---|
| CN | 101699410 A | 4/2010 |
| JP | 2010-206697 A | 9/2010 |

*Primary Examiner* — Ruihua Zhang
(74) *Attorney, Agent, or Firm* — Mintz Levin Cohn Ferris Glovsky and Popeo, P.C.; Peter F. Corless

(57) ABSTRACT

A network diagnosis method and apparatus are disclosed. An operation method of a first communication node includes checking whether each of communication nodes connected to the first communication node are in a fault state based on a first message transmitted between the communication nodes and a first response message, which is a response to the first message and generating a diagnosis response message including identification information of the communication node that is in a fault state or normal state. Accordingly, network performance may be enhanced.

10 Claims, 6 Drawing Sheets

(56) References Cited

U.S. PATENT DOCUMENTS

| | | | |
|---|---|---|---|
| 2014/0036693 A1* | 2/2014 | Mabuchi | H04L 43/10 370/243 |
| 2015/0227404 A1* | 8/2015 | Rajagopal | G06F 11/0748 714/37 |
| 2017/0078175 A1* | 3/2017 | Xu | H04L 12/24 |

* cited by examiner

METHOD AND APPARATUS FOR DIAGNOSING NETWORK

CLAIM FOR PRIORITY

This application claims priority to U.S. patent application Ser. No. 62/026,343 filed on Jul. 18, 2014, U.S. patent application Ser. No. 62/026,335 filed on Jul. 18, 2014, and Korean Patent Application No. 2015-0098909 filed on Jul. 13, 2015 in the Korean Intellectual Property Office (KIPO), the entire contents of which are hereby incorporated by reference.

BACKGROUND

1. Technical Field

Example embodiments of the present invention relate in general to a network diagnosis technique and more specifically to a method and apparatus for diagnosing a state of a communication node constituting a network and a state of a channel (or port) to which the communication node is connected.

2. Related Art

Along with the rapid digitalization of vehicle parts, the number and types of electronic devices installed in a vehicle are being significantly increased. Electronic devices may be largely used in a power train control system, a body control system, a chassis control system, a vehicle network, a multimedia system, or the like. The power train control system may denote an engine control system, an automatic transmission control system, etc. The body control system may denote a body electronic equipment control system, a convenience apparatus control system, a lamp control system, etc. The chassis control system may denote a steering apparatus control system, a brake control system, a suspension control system, etc. The vehicle network may denote a controller area network (CAN), a FlexRay-based network, a media oriented system transport (MOST)-based network, etc. The multimedia system may denote a navigation apparatus system, a telematics system, an infortainment system, etc.

Such systems and electronic devices constituting each of the systems are connected through the vehicle network, which is required to support functions of the electronic devices. The CAN may support a transmission rate of up to 1 Mbps and may support auto retransmission of colliding messages, error detection-based on a cycle redundancy interface (CRC), etc. The FlexRay-based network may support a transmission rate of up to 10 Mbps and may support simultaneous transmission of data through two channels, synchronous data transmission, etc. The MOST-based network is a communication network for high-quality multimedia, which may support a transmission rate of up to 150 Mbps.

Meanwhile, the telematics system, the infortainment system, and an enhanced safety system of a vehicle require high transmission rates and system expandability. However, the CAN, FlexRay-based network, or the like may not sufficiently support the requirements. The MOST-based network may support a higher transmission rate than the CAN and the FlexRay-based network. However, it costs a great deal to apply the MOST-based network to all vehicle networks. Due to these limitations, an Ethernet based network may be considered as a vehicle network. The Ethernet-based network may support bi-directional communication through one pair of windings and may support a transmission rate of up to 10 Gbps.

An Ethernet-based vehicle network may include a plurality of communication nodes. Accordingly, there is a need for a method for diagnosing a state (that is, a normal state or a fault state) of each communication node and a state of a channel (or port) to which the communication node is connected.

SUMMARY

Accordingly, example embodiments of the present invention are provided to substantially obviate one or more problems due to limitations and disadvantages of the related art.

Example embodiments of the present invention provide a method for diagnosing a state of a communication node constituting a network and a state of a channel (or port) to which the communication node is connected.

Example embodiments of the present invention also provide an apparatus for diagnosing a state of a communication node constituting a network and a state of a channel (or port) to which the communication node is connected.

In some example embodiments, an operation method of a first communication node includes checking whether each of communication nodes connected to the first communication node is in a fault state based on a first message and a first response message in response to the first message transmitted between the communication nodes; and generating a diagnosis response message including identification information of the communication node that is in a fault state or normal state.

Here, the first message may be an NM message.

Here, when the first response message in response to the first message is not received within a predefined period of time, the first communication node may determine that a communication node from which the first response message is to be transmitted is in a fault state.

Here, the first communication node may be a switch or bridge, and each of the communication nodes connected to the first communication node may be an end node.

Here, the identification information may be at least one of an Internet protocol (IP) address, a port number, and a medium access control (MAC) address.

Here, the diagnosis response message may be generated when a diagnosis request message is received from an OBD device.

Here, each of the first message, the first response message, the diagnosis request message, and the diagnosis response message may be a message generated based on an Ethernet protocol.

In addition, the operation method may further include transmitting the diagnosis response message to an OBD device.

Here, the diagnosis response message may be transmitted in a broadcast manner.

In other example embodiments, an operation method of a first communication node includes transmitting a first message to at least one communication node connected to the first communication node; checking whether the at least one communication node connected to the first communication node is in a fault state based on a reception state of a first response message in response to the first message; and generating a diagnosis response message including identification information of the communication node that is in a fault state or normal state.

Here, when the first response message in response to the first message is not received within a predefined period of time, the first communication node may determine that a communication node from which the first response message is to be transmitted is in a fault state.

Here, the first communication node may be a switch or bridge, and the at least one communication node connected to the first communication node may be an end node.

Here, the identification information may be at least one of an IP address, a port number, and a MAC address.

Here, the diagnosis response message may be generated when a diagnosis request message is received from an OBD device.

Here, each of the first message, the first response message, the diagnosis request message, and the diagnosis response message may be a message generated based on an Ethernet protocol.

In addition, the operation method may further include transmitting the diagnosis response message to an OBD device.

In still other example embodiments, an operation method of an on-board diagnostics device includes transmitting a diagnosis request message to a first communication node and receiving, from the first communication node, a diagnosis response message including identification information of a communication node that is in a fault state or normal state among the at least one communication node connected to the first communication node.

Here, the first communication node may be a switch or bridge, and the at least one communication node connected to the first communication node may be an end node.

Here, each of the diagnosis request message and the diagnosis response message may be a message generated based on an Ethernet protocol.

Here, the identification information may be at least one of an IP address, a port number, and a MAC address.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Since the present invention may be variously modified and have several exemplary embodiments, specific exemplary embodiments will be shown in the accompanying drawings and be described in detail in the detailed description. It should be understood, however, that it is not intended to limit the present invention to the specific embodiments but, on the contrary, the present invention is to cover all modifications and alternatives falling within the spirit and scope of the present invention.

Relational terms such as first, second, and the like may be used for describing various elements, but the elements should not be limited by the terms. These terms are only used to distinguish one element from another. For example, a first component may be named a second component without being departed from the scope of the present invention and the second component may also be similarly named the first component. The term 'and/or' means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

In the following description, the technical terms are used only for explaining a specific exemplary embodiment while not limiting the present disclosure. The singular forms 'a,' 'an,' and 'the' include plural reference unless the context clearly dictates otherwise. In the present specification, it will be understood that the terms "have," "comprise," "include," and the like are used to specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. Terms such as terms that are generally used and have been in dictionaries should be construed as having meanings matched with contextual meanings in the art. In this description, unless defined clearly, terms are not ideally, excessively construed as formal meanings.

Hereinafter, preferred embodiments of the present invention will be described in detail with reference to the accompanying drawings. In describing the invention, in order to facilitate the entire understanding of the invention, like numbers refer to like elements throughout the description of the figures and the repetitive description thereof will be omitted.

Figure 1:
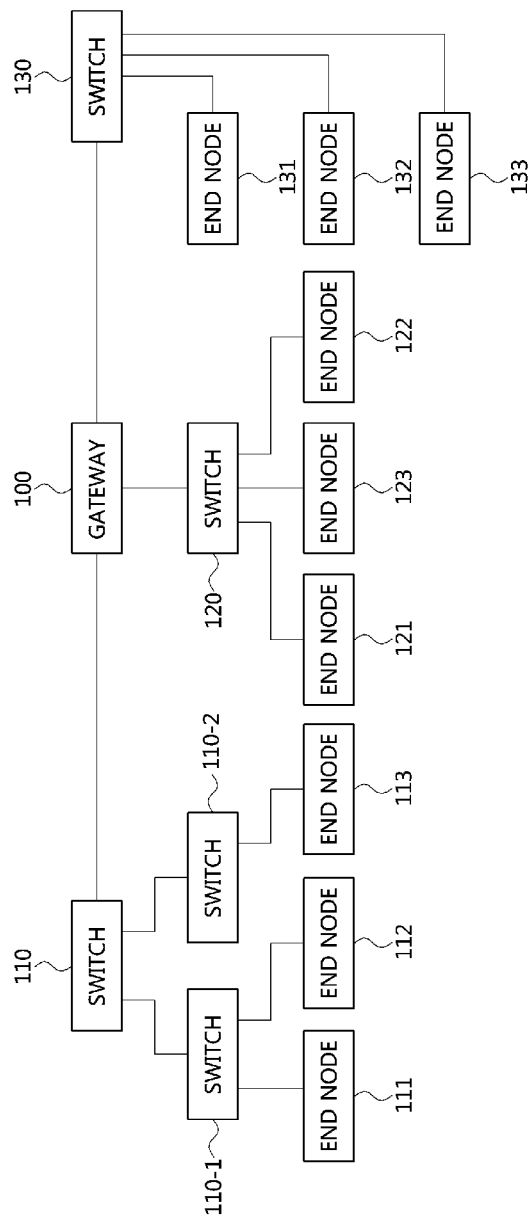
FIG. 1 is a block diagram showing a vehicle network topology according to an embodiment.

FIG. 1 is a block diagram showing a vehicle network topology according to an embodiment.

Referring to FIG. 1, a communication node may denote a gateway, a switch (or bridge), or an end node. The gateway 100 may be connected with at least one switch 110, 110-1, 110-2, 120, and 130 and configured to connect different networks. For example, the gateway 100 may connect a switch that supports a controller area network (CAN) (FlexRay, media oriented system transport (MOST), or local interconnect network (LIN)) protocol and a switch that supports an Ethernet protocol. The switches 110, 110-1, 110-2, 120, and 130 may be connected with at least one end nodes 111, 112, 113, 121, 122, 123, 131, 132, and 133. The switches 110, 110-1, 110-2, 120, and 130 may interconnect and control the end nodes 111, 112, 113, 121, 122, 123, 131, 132, and 133.

The end nodes 111, 112, 113, 121, 122, 123, 131, 132, and 133 may denote an electronic control unit (ECU) that controls various types of devices included in a vehicle. For example, the end nodes 111, 112, 113, 121, 122, 123, 131, 132, and 133 may denote an ECU constituting an infotainment device (e.g., a display device, a navigation device, and an around view monitoring device).

Communication nodes (that is, a gateway, a switch, an end node, or the like) constituting a vehicle network may be connected in a star topology, bus topology, ring topology, tree topology, mesh topology, etc. In addition, the communication nodes constituting the vehicle network may support a CAN protocol, FlexRay protocol, MOST protocol, LIN protocol, or Ethernet protocol. Embodiments of the present invention may be applied to the above-described network topology. The network topology to which embodiments of the present invention are to be applied is not limited thereto and may be configured in various ways.

Figure 2:
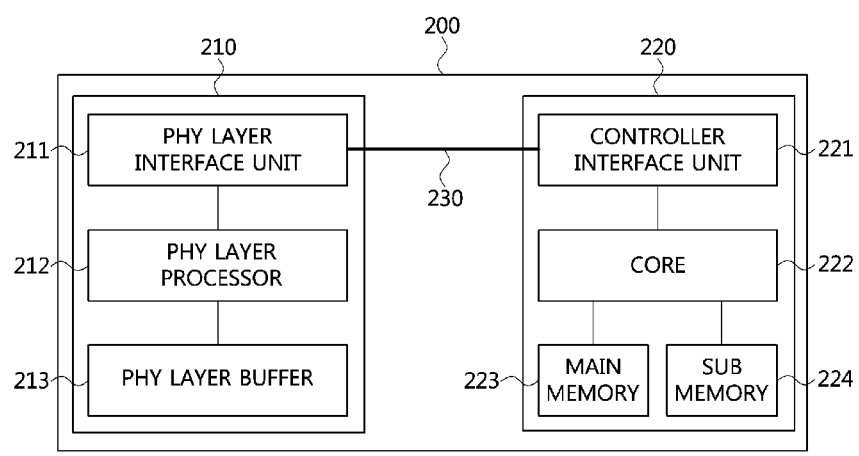
FIG. 2 is a block diagram showing a communication node constituting a vehicle network according to an embodiment.

FIG. 2 is a block diagram showing a communication node constituting a vehicle network according to an embodiment.

Referring to FIG. 2, a communication node 200 constituting a network may include a PHY layer block 210 and a controller 220. In this case, the controller 220 may be implemented to include a medium access control (MAC) layer. A PHY layer block 210 may receive or transmit signals from or to another communication node. The controller 220 may control the PHY layer block 210 and perform various functions (e.g., an infotainment function). The PHY layer block 210 and the controller 220 may be implemented as one system on chip (SoC) and may be implemented as separate chips.

The PHY layer block 210 and the controller 220 may be connected through a media independent interface (MII) 230. The MII 230 may denote an interface defined in the IEEE 802.3 and may include a data interface and a management interface between the PHY layer block 210 and the controller 220. One of a reduced MII (RMII), a gigabit MII (GMII), a reduced GMII (RGMII), a serial GMII (SGMII), a 10 GMII (XGMII) may be used instead of the MII 230. A data interface may include a transmission channel and a reception channel, each of which may have an independent clock, data, and a control signal. The management interface may include a two-signal interface. One is a signal for the clock, and the other is a signal for the data.

The PHY layer block 210 may include a PHY layer interface unit 211, a PHY layer processor 212, and a PHY layer buffer 213. The configuration of the PHY layer block 210 is not limited thereto, and the PHY layer block 210 may be configured in various ways. The PHY layer interface unit 211 may transmit a signal received from the controller 220 to the PHY layer processor 212 and may transmit a signal received from the PHY layer processor 212 to the controller 220. The PHY layer processor 212 may control operations of the PHY layer interface unit 211 and the PHY layer buffer 213. The PHY layer processor 212 may modulate a signal to be transmitted or demodulate a received signal. The PHY layer processor 212 may control the PHY layer buffer 213 to input or output a signal. The PHY layer buffer 213 may store the received signal and may output the stored signal according to a request from the PHY layer processor 212.

The controller 220 may monitor and control the PHY layer block 210 through the MII 230. The controller 220 may include a controller interface unit 221, a core 222, a main memory 223, and a sub memory 224. The configuration of the controller 220 is not limited thereto, and the controller 220 may be configured in various ways. The controller interface unit 221 may receive a signal from the PHY layer block 210 (that is, the PHY layer interface 211) or an upper layer (not shown), transmit the received signal to the core 222, and transmit the signal received from the core 222 to the PHY layer block 210 or upper layer. The core 222 may further include an independent memory control logic or an integrated memory control logic for controlling the controller interface unit 221, the main memory 223, and the sub memory 224. The memory control logic may be implemented to be included in the main memory 223 and the sub memory 224 or may be implemented to be included in the core 222.

Each of the main memory 223 and the sub memory 224 may store a signal processed by the core 222 and may output the stored signal according to a request from the core 222. The main memory 223 may denote a volatile memory (e.g., a random access memory (RAM)) that temporarily stores data needed for the operation of the core 222. The sub memory 224 may denote a non-volatile memory in which an operating system code (e.g., a kernel and a device driver) and an application program code for performing a function of the controller 220 are stored. A flash memory having a high processing speed or a hard disc drive (HDD) or a compact disc-read only memory (CD-ROM) for large capacity data storage may be used as the non-volatile memory. Typically, the core 222 may include a logic circuit including at least one processing core. A core of an Advanced RISC Machines (ARM) family or a core of an Atom family may be used as the core 222.

A method performed by a communication node and a corresponding counterpart communication node, which belong to a vehicle network, will be described below. Although a method (e.g., signal transmission or reception) performed by a first communication node will be described below, a second communication node corresponding thereto may perform a method (e.g., signal reception or transmission) corresponding to the method performed by the first communication node. That is, when an operation of the first communication node is described, the second communication node corresponding thereto may perform an operation corresponding to the operation of the first communication node. On the contrary, when an operation of the second communication node is described, the first communication node may perform an operation corresponding to an operation of a switch.

Figure 3:
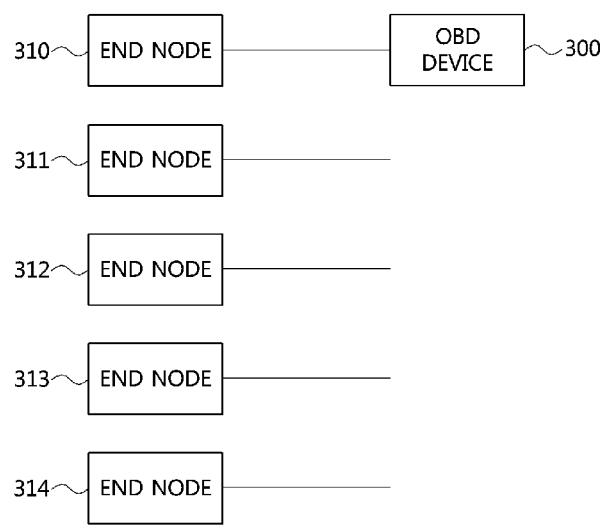
FIG. 3 is a block diagram for describing a method for diagnosing a vehicle network using an on-board diagnostics (OBD) device according to an embodiment.

FIG. 3 is a block diagram for describing a method for diagnosing a vehicle network using an on-board diagnostics (OBD) device according to an embodiment.

Referring to FIG. 3, end nodes 310, 311, 312, 313, and 314 may constitute the vehicle network described with reference to FIG. 1 and may support an Ethernet protocol. Each of the end nodes 310, 311, 312, 313, and 314 may denote the communication node 200 described with reference to FIG. 2. The end nodes 310, 311, 312, 313, and 314 may be connected to the same or different switches. In order to diagnose a state (that is, a normal state or a fault state) of each of the end nodes 310, 311, 312, 313, and 314 and a state of a channel (or port) to which each of the end nodes 310, 311, 312, 313, and 314 is connected, the end nodes 310, 311, 312, 313, and 314 may be connected with an OBD device 300 on a one-to-one basis. That is, in order to diagnose the state of the end node 310 and the state of the channel to which the end node 310 is connected, the OBD device 300 may be physically connected with the end node 310 on a one-to-one basis.

When the OBD device 300 and the end node 310 may be connected on a one-to-one basis, the OBD device 300 may generate a diagnosis request message and may transmit the generated diagnosis request message to the end node 310. Upon receiving the diagnosis request message from the OBD device 300, the end node 310 may generate a diagnosis response message, which is a response to the diagnosis request message, and may transmit the generated diagnosis response message to the OBD device 300. Alternatively, upon receiving the diagnosis request message from the OBD device 300, the end node 310 may transmit an acknowledgement (ACK) message, which is a response to the diagnosis request message, to the OBD device 300. Upon receiving a diagnosis response message (or ACK message), which is a response to the diagnosis request message from the end node 310, within a predefined period of time from a transmission end time of the diagnosis request message, the OBD device 300 may determine that the end node 310 and the channel to which the end node 310 is connected are in a normal state. On the contrary, upon not receiving the diagnosis response message (or ACK message), which is the response to the diagnosis request message from the end node 310, within the period of time from the transmission end time of the diagnosis request message, the OBD device 300 may determine that the end node 310 and the channel to which the end node 310 is connected are in a fault state.

The OBD device 300 may determine states of the remaining end nodes 311, 312, 313, and 314 by performing the above-described procedure with the end nodes 311, 312, 313, and 314. The vehicle network may include a very large number of end nodes. In order to determine states of all the end nodes constituting the vehicle network, a procedure in which the OBD device 300 and the end node are physically connected on a one-to-one basis and a procedure in which a message is exchanged between the OBD device 300 and the end node may be performed on all the end nodes constituting the vehicle network. In this case, it costs much time to determine the states of all the end nodes constituting the vehicle network.

Figure 4:
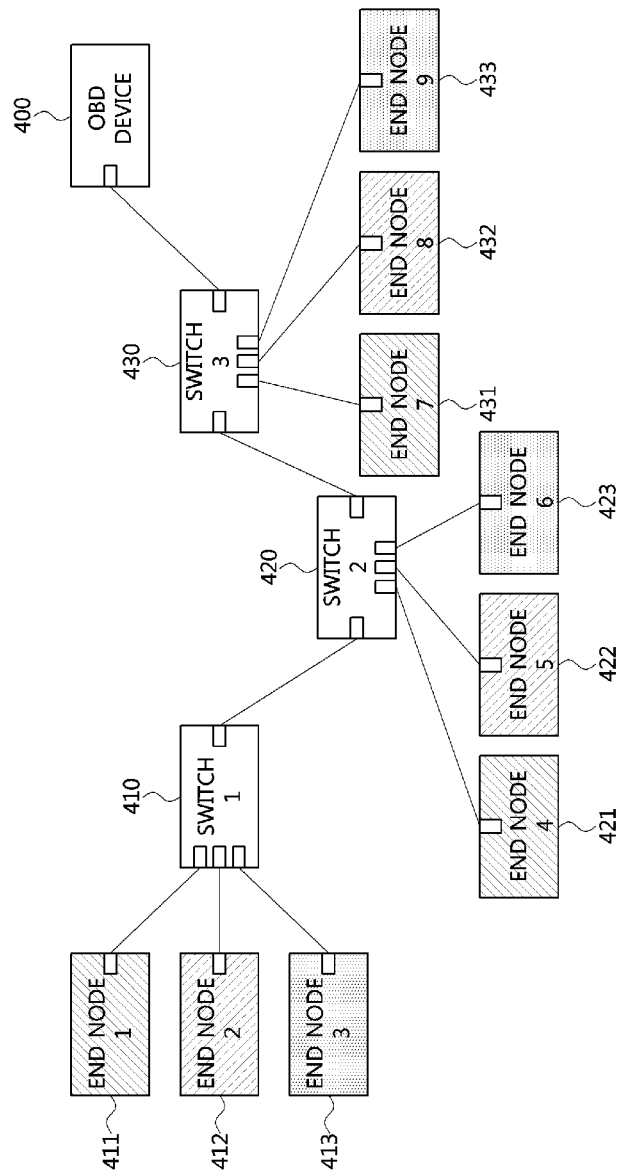
FIG. 4 is a block diagram for describing a method for diagnosing a vehicle network using an OBD device according to another embodiment.

FIG. 4 is a block diagram for describing a method for diagnosing a vehicle network using an OBD device according to another embodiment.

Referring to FIG. 4, switches 410, 420, and 430 and end nodes 411, 412, 413, 421, 422, 423, 431, 432, and 433 may constitute the vehicle network described with reference to FIG. 1 and may support an Ethernet protocol. Each of the switches 410, 420, and 430 and end nodes 411, 412, 413, 421, 422, 423, 431, 432, and 433 may denote the communication node 200 described with reference to FIG. 2. The first switch 410 may be connected with the end nodes 411, 412, and 413 via respective ports and may be connected with the second switch 420. The second switch 420 may be connected with the end nodes 421, 422, and 423 via respective ports and may be connected with the first switch 410 and the third switch 430. The third switch 430 may be connected with the end nodes 431, 432, and 433 via respective ports and may be connected with the second switch 420.

An OBD device 400 may be connected to one communication node (e.g., the third switch 430) belonging to the vehicle network in order to diagnose a state of the vehicle network. That is, the OBD device 400 may be connected on a one-to-one basis not with only one communication node, but with all the communication nodes constituting the vehicle network. In this case, through one communication node connected thereto, the OBD device 400 may acquire diagnosis information regarding states of a plurality of communication nodes constituting the vehicle network and states of channels to which the plurality of communication nodes are connected. A method of acquiring the diagnosis information regarding the plurality of communication nodes constituting the vehicle network will be described below in detail.

The first end node 411, the fourth end node 421, and the seventh end node 431 may belong to a first system (e.g., a power train control system) included in a vehicle. The second end node 412, the fifth end node 422, and the eighth end node 432 may belong to a second system (e.g., a body control system) included in the vehicle. The third end node 413, the sixth end node 423, and the ninth end node 433 may belong to a third system (e.g., a multimedia system) included in the vehicle. That is, the end nodes 411, 412, 413, 421, 422, 423, 431, 432, and 433 connected to the respective switches 410, 420, and 430 may belong to different systems.

Each of the switches 410, 420, and 430 and end nodes 411, 412, 413, 421, 422, 423, 431, 432, and 433 may have topology information regarding the vehicle network. For example, when power is applied to the vehicle network (e.g., the vehicle is equipped with a battery), each of the switches 410, 420, and 430 and end nodes 411, 412, 413, 421, 422, 423, 431, 432, and 433 may receive a message including the topology information regarding the vehicle network from its upper communication node (e.g., a switch, a gateway, etc.) and may check the topology of the vehicle network through the received message. Alternatively, the topology information regarding the vehicle network may be pre-stored in the switches 410, 420, and 430 and end nodes 411, 412, 413, 421, 422, 423, 431, 432, and 433. When the switches 410, 420, and 430 and end nodes 411, 412, 413, 421, 422, 423, 431, 432, and 433 may check the topology of the vehicle network on the basis of the stored information.

The end nodes 411, 412, 413, 421, 422, 423, 431, 432, and 433 may have respective unique Internet protocols (IPs). When power is applied to the vehicle network (e.g., the vehicle is equipped with a battery), respective IP addresses may be set to the end nodes 411, 412, 413, 421, 422, 423, 431, 432, and 433. For example, when power is applied to the vehicle network (e.g., the vehicle is equipped with a battery), each of the switches 410, 420, and 430 and end nodes 411, 412, 413, 421, 422, 423, 431, 432, and 433 may receive a message including an IP address from its upper communication node (e.g., a switch, a gateway, etc.) and may set the IP address included in the received message as its own IP address. Alternatively, the IP address may be pre-stored in each of the end nodes 411, 412, 413, 421, 422, 423, 431, 432, and 433. When each of the end nodes 411, 412, 413, 421, 422, 423, 431, 432, and 433 may set the pre-stored IP address as its own IP address.

The IP address may have a form of "10.xxx.yyy.zz." The segment "xxx" in the IP address may indicate a vehicle system to which a corresponding communication node belongs. That is, communication nodes belonged to the same system may have the same "xxx." For example, the segment "xxx" in IP addresses of the first end node 411, the fourth end node 421, and the seventh end node 431 may be set to be "100." For example, the segment "xxx" in IP addresses of the second end node 412, the fifth end node 422, and the eighth end node 432 may be set to be "200." For example, the segment "xxx" in IP addresses of the third end node 413, the sixth end node 423, and the ninth end node 433 may be set to be "300."

The segment "yyy" in the IP address may indicate a class of a corresponding communication node. For example, the segment "yyy" in an IP address of a communication node in the lowest class (that is, an end node) among the communication nodes constituting the vehicle network may be set to be "001," and the segment "yyy" in an IP address of a communication node in the second lowest class may be set to be "002." The segment "zz" in the IP address may denote an index used to distinguish the communication nodes that belong to a class indicated by "yyy" among the communication nodes that belong to a system indicated by "xxx." Accordingly, the communication nodes that belong to a class indicated by "yyy" among the communication nodes that belong to a system indicated by "xxx" may have different "zz." The IP addresses of the end nodes 411, 412, 413, 421, 422, 423, 431, 432, and 433 may be set as shown in the following Table 1.

TABLE 1

| Type of Communication Node | IP Address |
|---|---|
| End node 1 | 10.100.001.01 |
| End node 2 | 10.200.001.01 |
| End node 3 | 10.300.001.01 |
| End node 4 | 10.100.001.02 |
| End node 5 | 10.200.001.02 |
| End node 6 | 10.300.001.02 |
| End node 7 | 10.100.001.03 |
| End node 8 | 10.200.001.03 |
| End node 9 | 10.300.001.03 |

The details of the method of setting an IP address of a communication node constituting a vehicle network are not limited to those described above, and the IP address of the communication node may be set in various ways.

Figure 5:
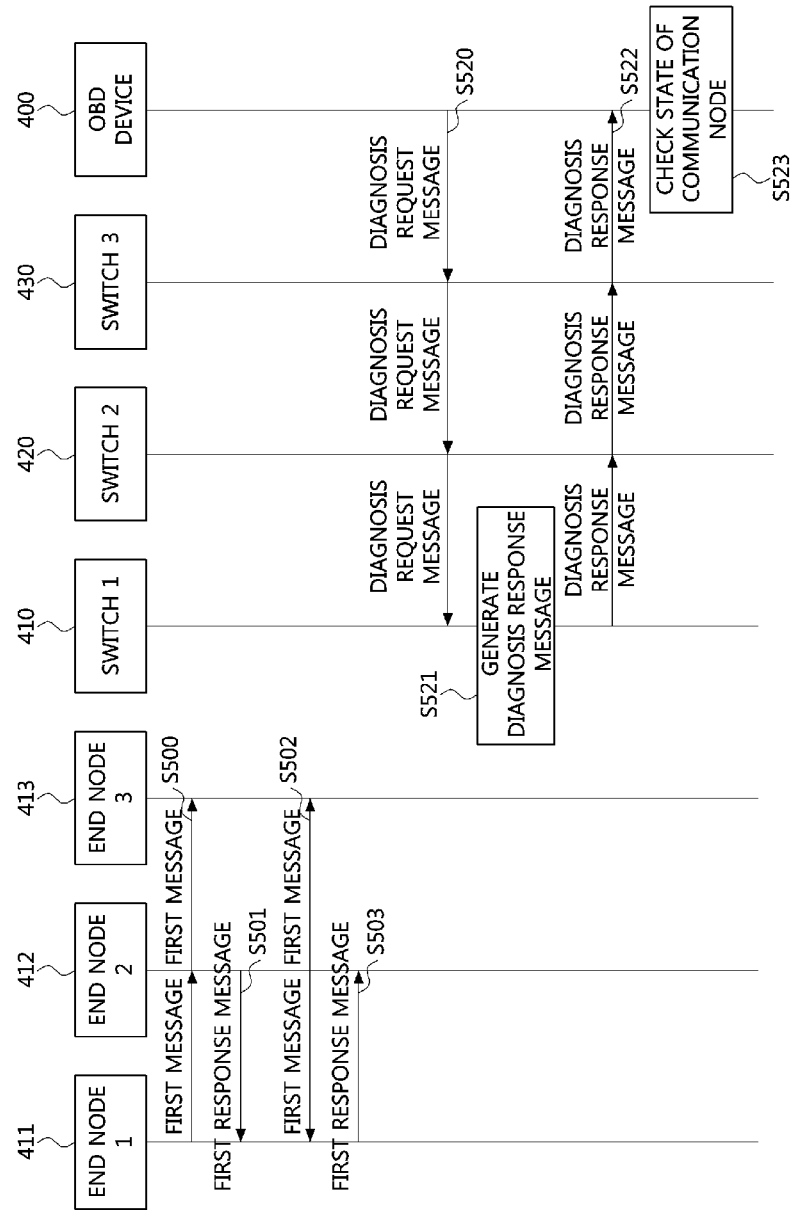
FIG. 5 is a sequence chart showing a network diagnosis method according to an embodiment of the present invention.
Figure 6:
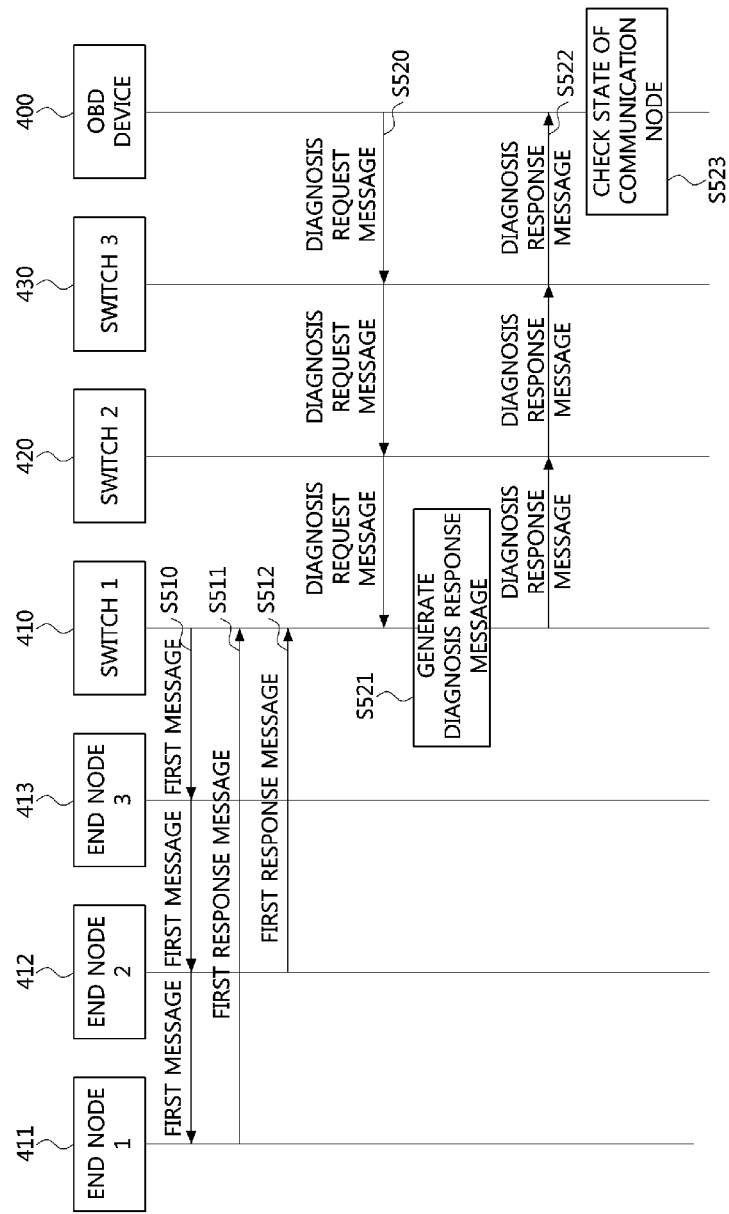
FIG. 6 is a sequence chart showing a network diagnosis method according to another embodiment of the present invention.

FIG. 5 is a sequence chart showing a network diagnosis method according to an embodiment of the present invention, and FIG. 6 is a sequence chart showing a network diagnosis method according to another embodiment of the present invention.

Referring to FIGS. 5 and 6, switches 410, 420, and 430, end nodes 411, 412, and 413, and an OBD device 400 may constitute the vehicle network described with reference to FIG. 4. That is, the switches 410, 420, and 430, the end nodes 411, 412, and 413, and the OBD device 400 may correspond to the configurations of the elements having the same numerals in the vehicle network shown in FIG. 4. In addition, the switches 410, 420, and 430, the end nodes 411, 412, and 413, and the OBD device 400 may have topology information regarding the vehicle network. The topology information of the vehicle network may include an IP address, a port address, and an MAC address of each of the communication nodes constituting the vehicle network. A network to which network diagnosis methods according to embodiments of the present invention are applied is not limited to the vehicle network shown in FIG. 4. The network diagnosis methods according to embodiments of the present invention may be applied to various networks. The network diagnosis methods according to embodiments of the present invention will be described on the basis of the first switch 410 and the end nodes 411, 412, and 413 connected to the first switch 410. However, the second switch 420 and the end nodes 421, 422, and 423 connected to the second switch 420 (or the third switch 430 and the end nodes 431, 432, and 433 connected to the third switch 430) may be diagnosed similarly or identically to methods to be described below.

The network diagnosis method shown in FIG. 5 and the network diagnosis method shown in FIG. 6 may have the same operations from S520 but different operations before S520. That is, message transmission/reception operations S500, S501, S502, and S503 for checking whether the end nodes 411, 412, and 413 are in a fault state in the network diagnosis method shown in FIG. 5 are different from message transmission/reception operations S510, S511, and S512 for checking whether the end nodes 411, 412, and 413 are in a fault state in the network diagnosis method shown in FIG. 6. A message (e.g., a first message, a first response message, a diagnosis request message, a diagnosis response message, etc.) used in embodiments of the present invention may denote a message that is generated based on an Ethernet protocol. The message that is generated based on the Ethernet protocol may be as follows.

Figure 7:
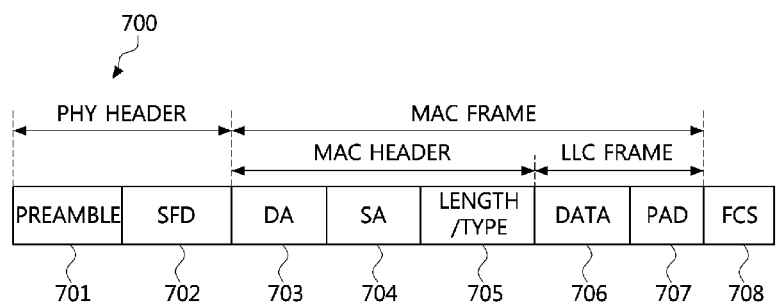
FIG. 7 is a block diagram showing an example of a message used in an Ethernet-based vehicle network.

FIG. 7 is a block diagram showing an example of a message used in an Ethernet-based vehicle network.

Referring to FIG. 7, an Ethernet protocol-based message 700 may include a physical (PHY) header, a MAC frame, and a frame check sequence (FCS) field 708. The MAC frame may be generated by the controller 220 of the communication node 200. The PHY header may include a preamble 701 and a start frame delimiter (SFD) field 702. The preamble 701 may have a size of 7 octets and may be used for timing synchronization. The SFD field 702 may have a sequence of "10101011."

The MAC frame may be positioned behind the SFD field 702. The MAC frame may include only an MAC header or may include the MAC header and a logic link control (LLC) frame. The MAC header may include a destination address (DA) field 703, a source address (SA) field 704, and a length/type field 705. The DA field 703 may have a size of 6 octets and may include identification information (e.g., an MAC address) of the communication node that receives the MAC frame. The SA field 704 may have a size of 6 octets and may include identification information (e.g., an MAC address) of the communication node that transmits the MAC frame.

The length/type field 705 may have a size of 2 octets and may indicate the length of the data field 706 or an Ethernet type that is supported by a communication node that transmits the protocol-based Ethernet frame 700. For example, when a first octet value included in the length/type field 705 is less than or equal to the decimal value 1500, the length/type field 705 may indicate the length of the data field 706. When the first octet value included in the length/type field 705 is more than or equal to the decimal value 1536, the length/type field 705 may indicate an Ethernet type. The LLC frame may include the data field 706 and may further include a pad field 707 if necessary (e.g., in order to satisfy a minimum size of the MAC frame). In this case, the pad field 707 may be added behind the data field 706.

Referring back to FIGS. 5 and 6, in the network diagnosis method according to an embodiment of the present invention, the first end node 411 may transmit a first message in a broadcast, multicast or unicast manner (S500). Here, the first message may denote a network management (NM) message. Upon receiving the first message from the first end node 411, the second end node 412 may transmit a first response message, which is a response to the first message, to the first end node 411 (S501). In this case, the second end node 412 may transmit the first response message to the first end node 411 within a predefined period of time from a reception time of the first message.

The first switch 410 may acquire the first message transmitted from the first end node 411 and the first response message transmitted from the second end node 412. Upon receiving the first response message from the second end node 412 within a predefined period of time from the reception time of the first message, the first switch 410 may determine that the second end node 412 and the channel (or port) connected to the second end node 412 are in a normal state. In addition, the first switch 410 may acquire identification information (e.g., MAC address) of the second end node 412 through the SA field included in the first response message. The first switch 410 may acquire an IP address, a port address, etc. corresponding to the MAC address of the second end node 412 from the already known topology information of the vehicle network.

Upon not receiving the first response message from the third end node 413 within a predefined period of time from the reception time of the first message, the first switch 410 may determine that the third end node 413 and the channel (or port) connected to the third end node 413 are in a fault state. For example, the first switch 410 may check an end node that transmits the first response message through the SA field included in the first response message. On the basis of the check result, the first switch 410 may check the third end node that does not transmit the first response message among the end nodes connected to the switch 1 410 and may determine the third end node 413 that does not transmit the first response message is in a fault state. Here, when the third end node 413 is in a fault state, or a channel (or port) between the first switch 410 and the third end node 413 is in a fault state, the first switch 410 may not receive the first response message from the third end node 413 within a predefined period of time from the reception time of the first message. The first switch 410 may acquire an IP address, a port address, an MAC address, etc. of the third end node 413 that is determined to be in a fault state from the already known topology information of the vehicle network.

Next, the second end node 412 may transmit the first message in a broadcast, multicast, or unicast manner (S502). Here, the first message may denote an NM message. Upon receiving the first message from the second end node 412, the first end node 411 may transmit the first response message, which is a response to the first message, to the second end node 412 (S503). In this case, the first end node 411 may transmit the first response message to the second end node 412 within a predefined period of time from a reception time of the first message.

The first switch 410 may acquire the first message transmitted from the second end node 412 and the first response message transmitted from the first end node 411. Upon receiving the first response message from the first end node 411 within a predefined period of time from the reception time of the first message, the first switch 410 may determine that the first end node 411 and the channel (or port) connected to the first end node 411 are in a normal state. In addition, the first switch 410 may acquire identification information (e.g., MAC address) of the first end node 411 through the SA field included in the first response message. The first switch 410 may acquire an IP address, a port address, etc. corresponding to the MAC address of the first end node 411 from the already known topology information of the vehicle network.

Upon not receiving the first response message from the third end node 413 within a predefined period of time from the reception time of the first message, the first switch 410 may determine that the third end node 413 and the channel (or port) connected to the third end node 413 are in a fault state. The first switch 410 may acquire an IP address, a port address, an MAC address, etc. of the third end node 413 that is determined to be in a fault state from the already known topology information of the vehicle network.

The third end node 413 that is in a fault state may not transmit the first message and the first response message. When the channel (or port) to which the third end node 413 is connected is in a fault state although the third end node 413 is in a normal state, the first message and first response message transmitted from the third end node 413 are not received by the first switch 410, the first end node 411, and the second end node 412.

Next, in the network diagnosis method according to another embodiment of the present invention, the first switch 410 may transmit a first message in a broadcast, multicast, or unicast manner (S510). Here, the first message may denote an NM message. Upon receiving the first message from the first switch 410, the first end node 411 may transmit a first response message (e.g., an ACK message), which is a response to the first message, to the first switch 410 (S511). In this case, the first end node 411 may transmit the first response message to the first switch 410 within a predefined period of time from a reception time of the first message. Upon receiving the first message from the first switch 410, the second end node 412 may transmit a first response message (e.g., an ACK message), which is a response to the first message, to the first switch 410 (S512). In this case, the second end node 412 may transmit the first response message to the first switch 410 within a predefined period of time from a reception time of the first message.

Since the first switch 410 has acquired the first response message from the first end node 411 and the second end node 412 within a predefined period of time from the transmission time of the first message, the first switch 410 may determine that the first end node 411 and the second end node 412 (or channels (or ports) connected to the first end node 411 and the second end node 412) are in a normal state. The first switch 410 may acquire identification information (e.g., MAC address) of the first end node 411 and the second end node 412 through the SA field included in the response message. The first switch 410 may acquire IP addresses, port addresses, etc. corresponding to the MAC addresses of the first end node 411 and the second end node 412 from the already known topology information of the vehicle network.

The third end node 413 that is in a fault state may not transmit the first response message, which is a response to the first message. When the channel (or port) to which the third end node 413 is connected is in a fault state although the third end node 413 is in a normal state, the first response message transmitted from the third end node 413 is not received by the first switch 410. Upon not receiving the first response message from the third end node 413 within a predefined period of time from the transmission time of the first message, the first switch 410 may determine that the third end node 413 and the channel (or port) connected to the third end node 413 are in a fault state. The first switch 410 may acquire an IP address, a port address, an MAC address, etc. of the third end node 413 that is determined to be in a fault state from the already known topology information of the vehicle network.

Next, the OBD device 400 may generate a diagnosis request message in order to diagnose the fault state of the vehicle network. The diagnosis request message may include at least one an indicator that request identification information of a communication node that is in a fault state (or a communication node that is connected to a channel (or port) that is in a fault state), an indicator that requests identification information of a communication node that is in a normal state (or a communication node that is connected a channel (or port) that is in a normal state), and an indicator that requests information regarding a state (that is, a normal state or fault state) of a communication mode constituting the vehicle network. Here, the indicator may be included in an MAC header or data field of the diagnosis request message. The OBD device 400 may transmit the diagnosis request message in a broadcast, multicast, or unicast manner (S520).

The diagnosis request message may be transmitted to the first switch 410 through the second switch 420 and the third switch 430. For example, the third switch 430 physically connected with the OBD device 400 may receive the diagnosis request message from the OBD device 400 and may transmit the diagnosis request message in a broadcast manner when the diagnosis request message is transmitted in the broadcast manner. The second switch 420 physically connected with the third switch 430 may receive the diagnosis request message from the third switch 430 and may transmit the diagnosis request message in a broadcast manner when the diagnosis request message is transmitted in the broadcast manner. The first switch 410 physically connected with the second switch 420 may receive the diagnosis request message from the second switch 420.

Alternatively, the third switch 430 physically connected with the OBD device 400 may receive the diagnosis request message from the OBD device 400, and may route the diagnosis request message to the second switch 420 connected with the first switch 410 when a DA address included in the diagnosis request message indicates the first switch 410. The second switch 420 physically connected with the third switch 430 may receive the diagnosis request message from the third switch 430 and may transmit the diagnosis request message to the first switch 410 when the DA address included in the diagnosis request message indicates the first switch 410. The first switch 410 physically connected with the second switch 420 may receive the diagnosis request message from the second switch 420.

Upon receiving the diagnosis request message, the first switch 410 may check information requested by the diagnosis request message (or information requested by an indicator included in the diagnosis request message) and may generate a diagnosis response message including the requested information (S521). When the diagnosis request message (or the indicator included in the diagnosis request message) requests identification information of a communication node that is in a fault state, the first switch 410 may generate a diagnosis response message including identification information of the third end node 413. Alternatively, when the diagnosis request message (or the indicator included in the diagnosis request message) requests identification information of a communication node that is in a normal state, the first switch 410 may generate a diagnosis response message including identification information of the first end node 411 and the second end node 412. Here, the identification information may be included in at least one of a MAC header and a data field of the diagnosis response message.

Alternatively, when the diagnosis request message (or the indicator included in the diagnosis request message) requests state information of a communication node constituting the vehicle network, the first switch 410 may generate a bitmap indicating states of the first end node 411, the second end node 412, and the third end node 413 and generate a diagnosis response message including the bitmap. The bitmap may be included in at least one of the MAC header and the data field of the diagnosis response message. Here, it is assumed that the first switch 410 and the OBD device 400 are aware of the order between the end nodes 411, 412, and 413 in the bitmap. For example, the first bit in the bit map may indicate the state of the first end node 411, the second bit in the bitmap may indicate the state of the second end node 412, and the third bit in the bitmap may indicate the state of the third end node 413. In addition, when the bit is set to the binary value 0, this may indicate that a corresponding communication node (or a channel (or port) connected to the corresponding communication node) is in a normal state. When the bit is set to the binary value 1, this may indicate that the corresponding communication node (or the channel (or port) connected to the corresponding communication node) is in a fault state. In this case, the first switch 410 may set the bitmap as "001" and may generate a diagnosis response message including "001." The details of the bitmap setting method are not limited to those described above, and the bitmap may be set in various ways.

Next, the first switch 410 may transmit the diagnosis response message to the OBD device 400 in a broadcast, multicast, or unicast manner (S522). That is, the diagnosis response message may be transmitted to the OBD device 400 through the second switch 420 and the third switch 430. Upon receiving the diagnosis response message, the OBD device 400 may check the states of the end nodes 411, 412, and 413 connected to the first switch 410 (S523). The OBD device 400 may determine that the first end node 411 and the second end node 412 are in a normal state and the third end node 413 is in a fault state. In embodiments of the present invention, it has been described that the diagnosis response message is generated after the diagnosis request message is received. However, the order in which the diagnosis response message is generated is not limited thereto. For example, the diagnosis response message may be generated before the diagnosis request message is received. The first switch 410 may transmit the previously generated diagnosis response message to the OBD device 400 upon receiving the diagnosis request message.

The methods according to embodiments of the present invention may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present invention or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present invention, and vice versa.

According to an embodiment of the present invention, it is possible to easily determine a state (that is, a normal state or a fault state) of each of communication nodes constituting a vehicle network and a state of a channel (or port) to which the communication node is connected. A communication node and channel in a fault state may be quickly repaired based on the determination result. Thus the performance of the vehicle network may be enhanced.

While the example embodiments of the present invention and their advantages have been described in detail, it should be understood that various changes, substitutions and alterations may be made herein without departing from the scope of the invention.

What is claimed is:

1. An operation method of a switch constituting a vehicle network, the operation method comprising:
    obtaining a first message which is transmitted between end nodes which are connected to the switch;
    checking whether a link state of a link between the end nodes is in a fault state based on a reception state of a first response message in response to the first message;
    receiving, from an on-board diagnostics (OBD) device, a diagnosis request message which requests transmission of information about the link state;
    generating a diagnosis response message including a bitmap which indicates the link state; and
    transmitting, to the OBD device, the diagnosis response message including the bitmap in response to the diagnosis request message, wherein
    a number of bits included in the bitmap is equal to a number of the end nodes which are connected to the switch,
    when a specific bit included in the bitmap is set as a first value, the specific bit indicates that a specific end node corresponding to the specific bit is in a normal state, and
    when the specific bit included in the bitmap is set as a second value, the specific bit indicates that the specific end node corresponding to the specific bit is in the fault state.

2. The operation method of claim 1, wherein the first message is a network management (NM) message.

3. The operation method of claim 1, wherein, when the first response message in response to the first message is not received within a predefined period of time, the switch identifies that the link state is in the fault state.

4. The operation method of claim 1, wherein each of the first message, the first response message, the diagnosis request message, and the diagnosis response message is a message generated based on an Ethernet protocol.

5. The operation method of claim 1, wherein the diagnosis response message is transmitted in a broadcast manner.

6. An operation method of a switch constituting a vehicle network, the operation method comprising:
    transmitting a first message to end nodes which are connected to the switch;
    checking whether a link state of a link between the end nodes is in a fault state based on a reception state of a first response message in response to the first message;
    receiving, from an on-board diagnostics (OBD); device, a diagnosis request message which requests transmission of information about the link state;
    when the diagnosis request message is received, generating a diagnosis response message including a bitmap which indicates the link state; and
    transmitting, to the OBD device, the diagnosis response message including the bitmap in response to the diagnosis request message, wherein
    a number of bits included in the bitmap is equal to a number of the end nodes which are connected to the switch,
    when a specific bit included in the bitmap is set as a first value, the specific bit indicates that a specific end node corresponding to the specific bit is in a normal state, and
    when the specific bit included in the bitmap is set as a second value, the specific bit indicates that the specific end node corresponding to the specific bit is in the fault state.

7. The operation method of claim 6, wherein, when the first response message in response to the first message is not received within a predefined period of time, the switch identifies that an end node among the end nodes which are connected to the switch from which the first response message is to be transmitted is in the fault state.

8. The operation method of claim 6, wherein each of the first message, the first response message, the diagnosis request message, and the diagnosis response message is a message generated based on an Ethernet protocol.

9. An operation method of an on-board diagnostics device, the operation method comprising:
    transmitting, to a switch, a diagnosis request message which requests transmission of information about a link state of a link between end nodes which are connected to the switch; and
    receiving, from the switch, a diagnosis response message including a bitmap which indicates the link state, wherein
    a number of bits included in the bitmap is equal to a number of the end nodes which are connected to the switch,
    when a specific bit included in the bitmap is set as a first value, the specific bit indicates that a specific end node corresponding to the specific bit is in a normal state, and
    when the specific bit included in the bitmap is set as a second value, the specific bit indicates that the specific end node corresponding to the specific bit is in a fault state.

10. The operation method of claim 9, wherein each of the diagnosis request message and the diagnosis response message is a message generated based on an Ethernet protocol.

* * * * *